(12) United States Patent
Nagashima et al.

(10) Patent No.: US 6,434,224 B1
(45) Date of Patent: Aug. 13, 2002

(54) COMMUNICATION SYSTEM CAPABLE OF DISPLAYING ADDRESSER INFORMATION AND METHOD FOR DISPLAYING ADDRESSER-RELATED INFORMATION (75) Inventors: Kunio Nagashima, Tokyo; Kazuyoshi Iijima, Shizuoka, both of (JP)

(73) Assignee: NEC Infrontia Corporation, Tokyo (JP)

( * ) Notice: Subject to any disclaimer, the term of this patent is extended or adjusted under 35 U.S.C. 154(b) by 0 days.

(21) Appl. No.: 09/241,074

(22) Filed: Feb. 1, 1999

(30) Foreign Application Priority Data

Jan. 31, 1998 (JP) .......................... 10-033876

(51) Int. Cl.[7] .............................................. H04M 11/00
(52) U.S. Cl. .................. 379/93.23; 345/808; 379/93.17
(58) Field of Search ........................ 379/93.23, 93.25, 379/93.17, 142.06, 142.15, 142.17, 142.01; 345/804, 805, 807, 808, 809, 802, 767

(56) References Cited

U.S. PATENT DOCUMENTS

| 5,054,055 A | * | 10/1991 | Hanle et al. ............. 379/93.23 |
| 5,479,497 A | * | 12/1995 | Kovarik ....................... 379/265 |
| 5,500,930 A | | 3/1996 | Fueki |
| 5,546,447 A | * | 8/1996 | Skarbo et al. ............. 379/93.23 |
| 5,696,815 A | | 12/1997 | Smyk |
| 6,018,571 A | * | 1/2000 | Langlois et al. ......... 379/93.17 |
| 6,018,578 A | * | 1/2000 | Bondarenko et al. ....... 379/265 |

FOREIGN PATENT DOCUMENTS

| JP | 8-32703 | 2/1996 |
| JP | 8-125770 | 5/1996 |
| JP | 9-191340 | 7/1997 |
| WO | WO 96/19066 | 6/1996 |
| WO | WO 97-17793 | 5/1997 |

* cited by examiner

Primary Examiner—Stella Woo
(74) Attorney, Agent, or Firm—Sughrue Mion, PLLC (57) ABSTRACT A communication system of the present invention retrieves first relevant information for an addresser according to received addresser information out of a storage circuit 14 and displays the first relevant information in a second window different from the first window and having a display priority higher than that of a first window of a first processing based on an application program in the program memory 16. In this case, the control circuit 12 keeps a display focus in the first window. Thereby, it is possible to display only the necessary and minimum addresser information without influencing an application currently used when a call is received. Moreover, the present invention can be constituted so as to display first relevant information in a tool bar.

13 Claims, 8 Drawing Sheets

FIG.1

| NO. | TEL | NAME | ADDRESS | PURCHASE HISTORY |
|---|---|---|---|---|
| | 141 | 142 | 143 | 144 |
| 1 | 03-3454-1111 | TARO NICHIDEN | ×××MINATO-KU,TOKYO | 97-05-11 PC-9821V200<br>97-11-22 PC-PR2000X |
| 2 | | | | |

FIG.11

COMMUNICATION SYSTEM CAPABLE OF DISPLAYING ADDRESSER INFORMATION AND METHOD FOR DISPLAYING ADDRESSER-RELATED INFORMATION

BACKGROUND OF THE INVENTION

1. Field of the Invention

The present invention relates to an addresser-information display unit for retrieving the information for an addresser previously stored in accordance with the addresser information communicated from a communication network such as a telephone network and displaying the information and a display method for displaying addresser-related information.

2. Description of the Prior Art

The originating telephone number display service has been known so far as the service for a telephone subscriber by a telephone company. The service communicates addresser information to a termination terminal unit from a communication network to make a termination terminal unit display the addresser information. Various applications using the addresser-information communicating service are devised. For example, there is an application to be applied to a terminal unit such as a personal computer. According to the application, when a call reaches a terminal unit from the addresser side of a network and addresser information is communicated from the network, the terminal unit retrieves the detailed information for the addresser out of the storage circuit of the terminal unit in accordance with the addresser information. Moreover, the detailed information that is the retrieval result is popup-displayed on a screen. According to the application, a terminal-unit operator can immediately obtain the detailed information for the addresser when a call is supplied from a network.

The official gazette of Japanese Patent Application Laid-Open No. 8-32703 issued on Feb. 2, 1996 discloses an addresser retrieval system to be set in a fire station. The addresser retrieval system receives an addresser ID from the switchboard of a network when a call is received, retrieves a data base in accordance with the addresser ID, and displays detailed information such as the name and address of the addresser on a display unit.

BRIEF SUMMARY OF THE INVENTION

Object of the Invention

When a terminal unit is an exclusive terminal for obtaining the detailed information of an addresser (addresser information retrieval system) or an exclusive terminal used to perform any service in accordance with obtained detailed information, the above application is convenient. However, in the case of a terminal unit frequently used to run a program for controlling a network and simultaneously start and execute other application software, the above application is inconvenient for an operator.

For example, when a call is received from a network and addresser information is communicated, the program of a terminal unit obtains a window focus in order to display the addresser information and the detailed information for the addresser and popup-displays the detailed information for the addresser or displays the information on the entire screen. As a result, the operation or processing of other application software then executed is interrupted.

For example, when the detailed information for the addresser is popup-displayed, it is impossible to execute other application software again before the popup display state is canceled by an input device such as a keyboard or mouse. Moreover, even if the detailed information is displayed on the entire screen, the display switching operation by the input device is necessary.

Furthermore, when pluralities of terminal units set in an office share one telephone line or more, the following problem occurs if each terminal unit allows an addresser telephone number to be displayed. That is, when a call is received, the detailed information for an addresser is displayed on the screens of all terminal units though it is enough to display the detailed information only on a certain terminal unit. As a result, the detailed information for an addresser is displayed on a terminal unit not requiring the information and the operation or processing of other application software executed by the terminal is interrupted.

As described above, there has been a problem that other application is interrupted by displaying the addresser-related information read out of a storage circuit in addition to the addresser information communicated from a network when a call is received.

It is an object of the present invention to provide a communication system capable of displaying addresser-related information in addition to the addresser information communicated from a network when a call is received without influencing other application software under use when the call is received from the network.

Summary of the Invention

A communication system of the present invention is connected to a network for receiving addresser information to make it possible to display information related to the received addresser information. The communication system includes a storage medium for storing the information related to addresser information and a control circuit. The control circuit controls display to display a first window for the first processing to be executed by an application program. Further, the control circuit retrieves first relevant information related to the addresser information out of the storage medium when the addresser information is received from a network, and controls the display to display the first relevant information in a second window having a display priority higher than that of the first window while keeping a window focus in the first window.

Another communication system of the present invention includes a storage medium for storing the information related to addresser information and a control circuit for displaying a first window for first processing to be executed by an application program, retrieving the first relevant information related to the addresser information out of the storage medium when the addresser information is received from a network, and controlling the display to display the first relevant information in a tool-bar-type second window different from the first window.

In the above invention, when a second window or an addresser-information form is displayed, a focus window is kept in the first window. Therefore, it is possible to display the necessary and minimum addresser information without influencing the first processing based on an application program currently used when a call is received.

The present invention is further provided with an input device for a display request, in which a control circuit retrieves the detailed information related to addresser information out of a storage medium in accordance with a display request from the input device and displays the retrieved detailed information in a third window. Thereby, it is possible to know the detailed information related to addresser according to necessity.

The present invention further provides a display method for displaying the information related to addresser information communicated from a network for communicating the addresser information to a termination side. The display method prepares a storage medium for storing the information related to addresser information, displays a first window for the first processing to be executed by an application program, retrieves the first relevant information related to addresser information out of the storage medium when the addresser information is received from a network, and displays the first relevant information in an addresser-information form different from the first window while keeping a window focus in the first window.

DETAILED DESCRIPTION OF THE PREFERRED EMBODIMENTS

Embodiments of the present invention are described below by referring to the accompanying drawings.

Figure 1:
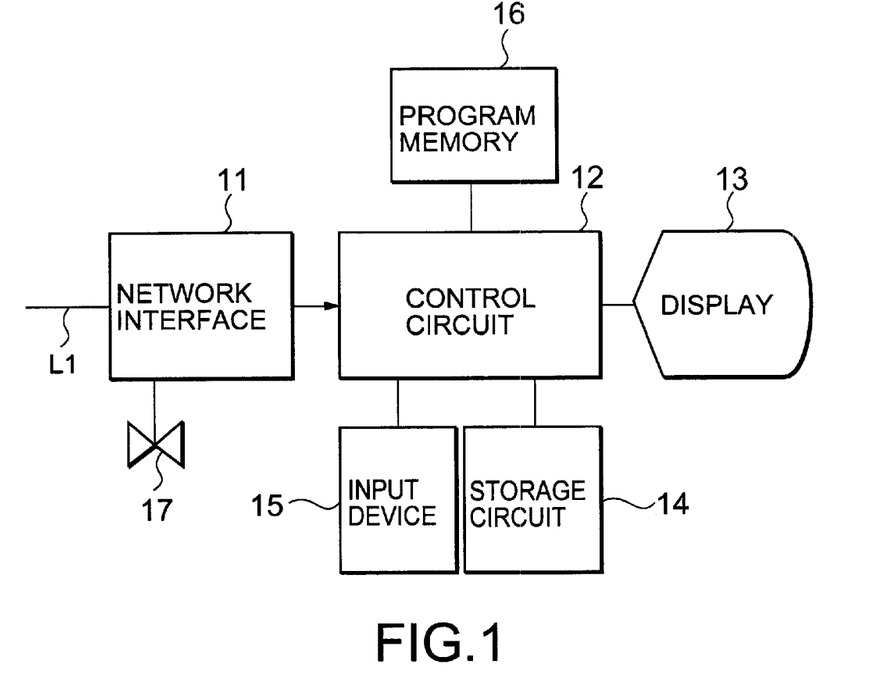
FIG. 1 is a block diagram showing the communication system of the first embodiment of the present invention.

FIG. 1 is a block diagram showing the structure of the communication system of an embodiment of the present invention capable of displaying addresser information. In FIG. 1, a network interface 11 is connected to the line L1 of a network. The network can use an analog telephone network or a digital network such as ISDN of a telephone company.

The network interface 11 detects a call sent from the network line L1 and has an addresser-number detecting function for detecting addresser information including an addresser telephone number communicated from a network. Moreover, a telephone 17 for performing conversation with other party through a network is connected to the network interface 11.

A control circuit 12 has an operating system (OS) for executing processing while displaying pluralities of windows on a display 13 and moreover has a function for making each window display the screen of an application according to the OS. Moreover, the control circuit 12 has a program memory 16 for storing a display control program for displaying addresser information or addresser-related information and controls data read and data write for a storage circuit 14 for storing addresser-related information and detailed information.

In the case of the embodiment of the present invention, the display control program is independent of other application program according to the OS. However, it is also possible to incorporate the display control program into the application program.

Figure 2:
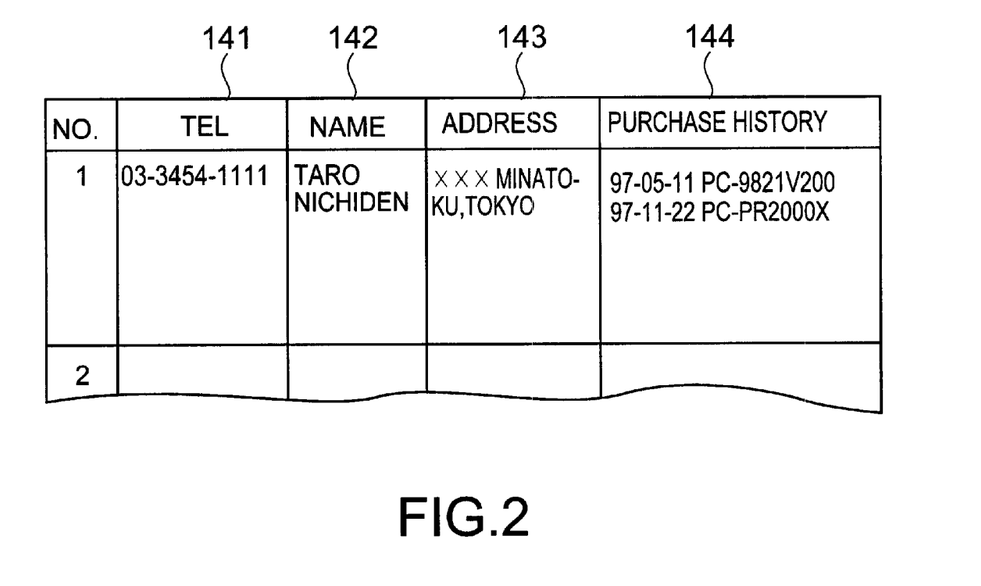
FIG. 2 is an illustration showing an example of the addresser-related information stored in the storage circuit of the communication system in FIG. 1.

The storage circuit 14 stores detailed information for the name, address, user management information, and transaction information corresponding to an addresser telephone number. FIG. 2 is an illustration showing an example of the detailed information stored in the storage circuit 14. The storage circuit 14 stores the name 142 and address 143 of an addresser and the product purchase history 144 by the addresser corresponding to each addresser telephone number 141. The storage circuit 14 can use any medium such as a semiconductor circuit or a magnetic disk as long as the medium stores information.

The control circuit 12 controls the following in accordance with the display control program in the program memory 16. Firstly, the control circuit 12 retrieves the addresser-related information (first relevant information) in the storage circuit 14 in accordance with the addresser information input from the network interface section 11. Secondly, the control circuit 12 displays an addresser-information form in an independent area in a display and displays a retrieval result in the form. The addresser-information form (second window) is different from a first window for the first processing (e.g. word-processor processing) to be executed by an application program according to an OS. Moreover, the display priority of the second window is higher than that of the first window displayed in accordance with the first processing, while the control circuit 12 keeps a window focus in the first window. Thirdly, the control circuit 12 retrieves second relevant information correspondingly to an input by an input device 15 through a mouse or keyboard or a response by the telephone 17 and displays the second relevant information in a third window as addresser's detailed information.

Therefore, the first relevant information for an addresser can be displayed without interrupting the first processing (e.g. word-processor processing or drawing generation processing) according to an application program executed by an OS. It is preferable to display an addresser-information form for displaying the first relevant information at a margin or corner of a screen so that the information does not interrupt the first window for the first processing. Moreover, to downsize indications, information having a little information content is displayed out of the information in the storage circuit 14.

Unless the operator of a communication system responds to a call received or has to know details of addresser information when viewing a first relevant information in the addresser-information form, it is possible to directly execute the application of an OS. Moreover, when the operator wants to know detailed addresser information, it is possible to popup-display the second relevant information as detailed information in accordance with an input event by a response of the input device 15 or telephone 17.

Figure 3:
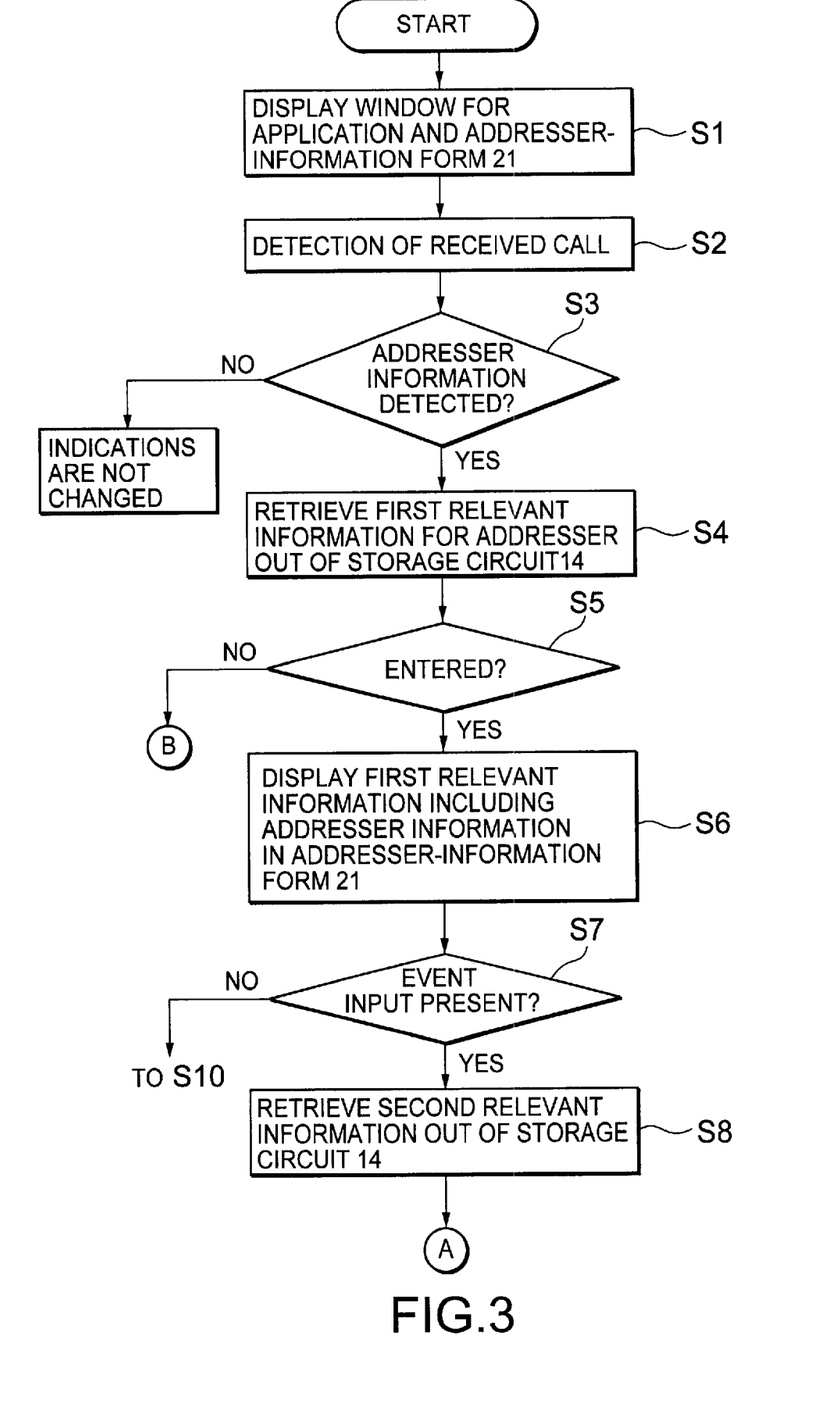
FIG. 3 is a flow chart showing the control processing by the control circuit of the communication system in FIG. 1.
Figure 4:
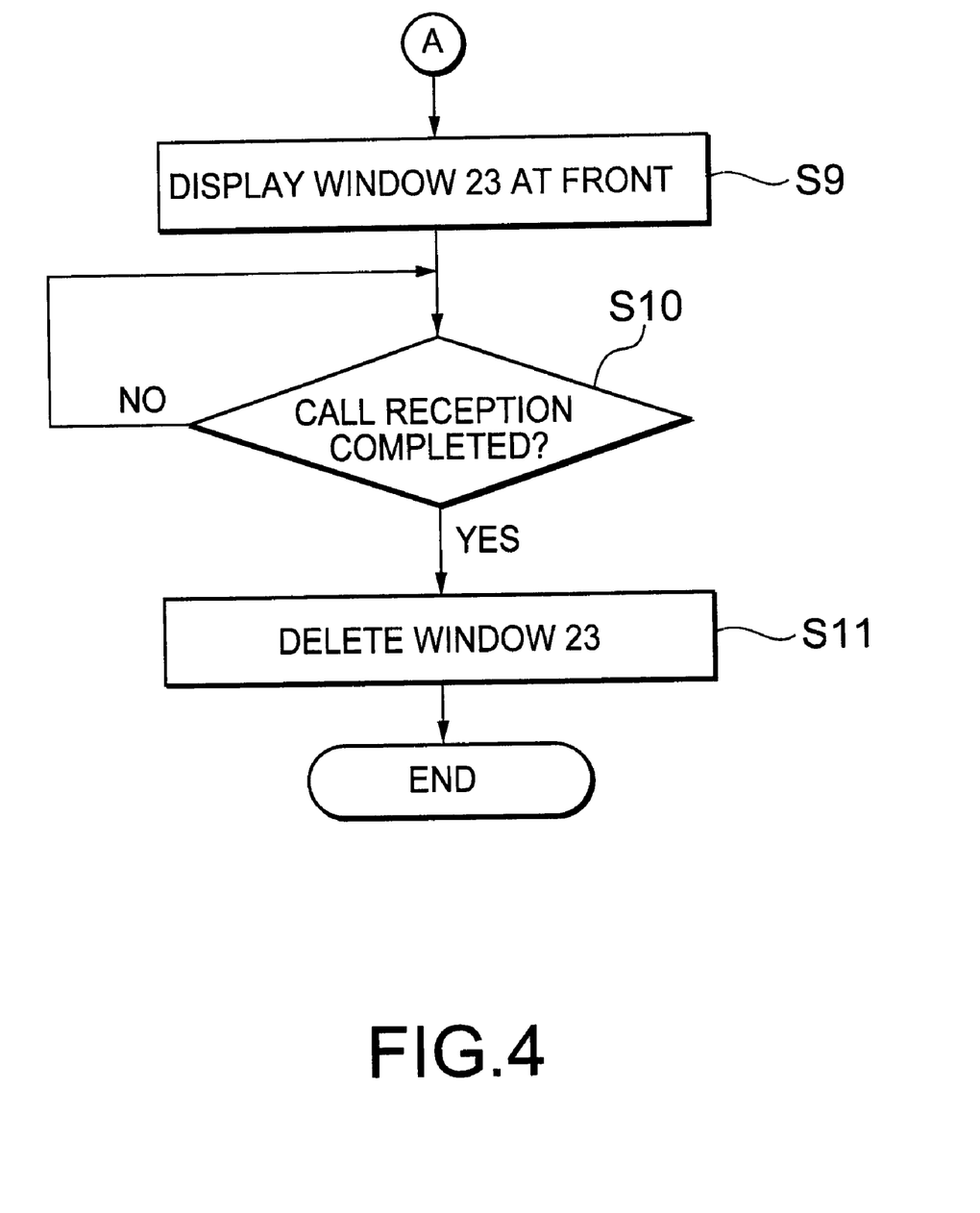
FIG. 4 is a flow chart showing a continuation of the control processing shown in FIG. 3.
Figure 5:
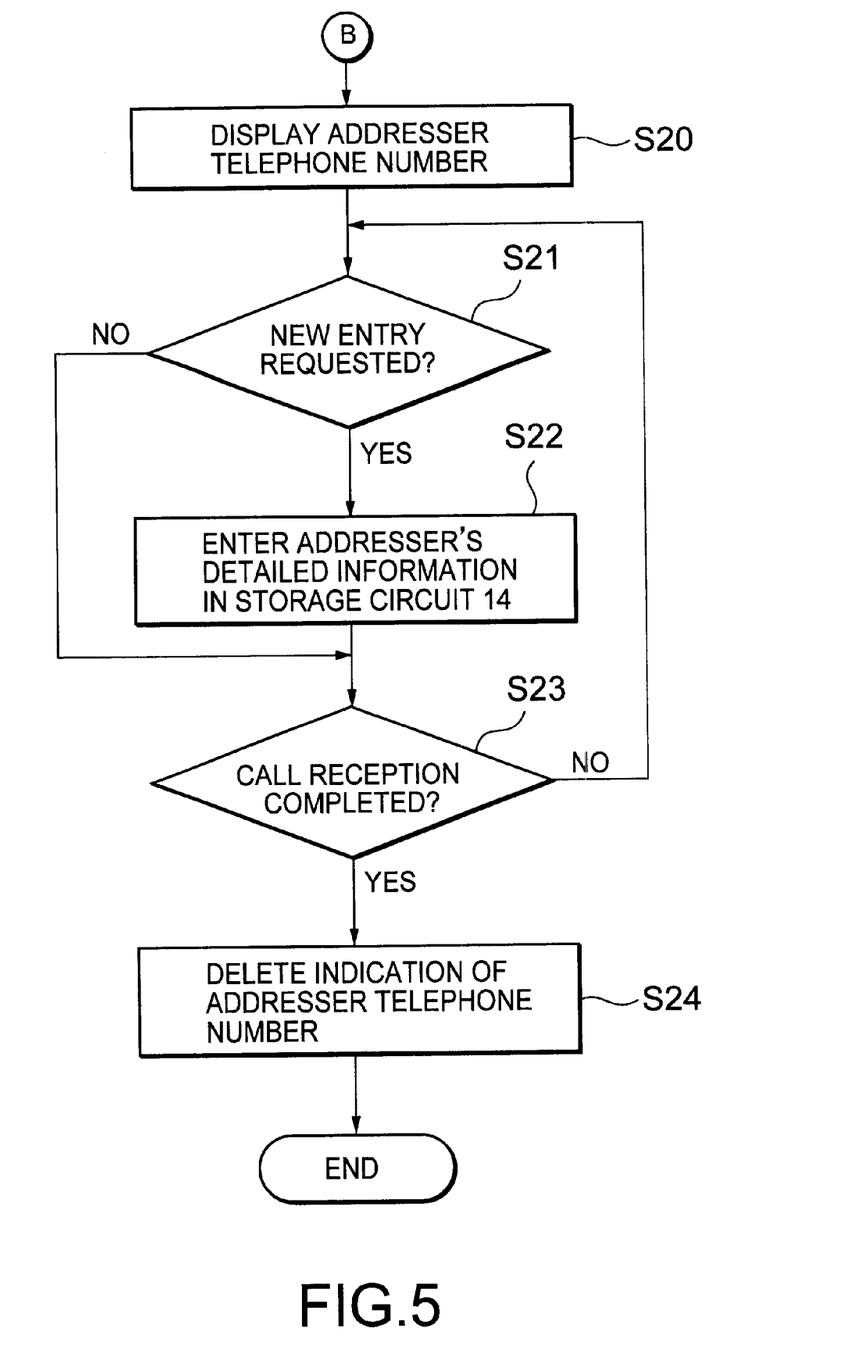
FIG. 5 is a flow chart showing a continuation of the control processing shown in FIG. 3.

FIGS. 3 to 5 are flow charts showing the display control operation to be executed by the control circuit 12 in FIG. 1.

Figure 6:
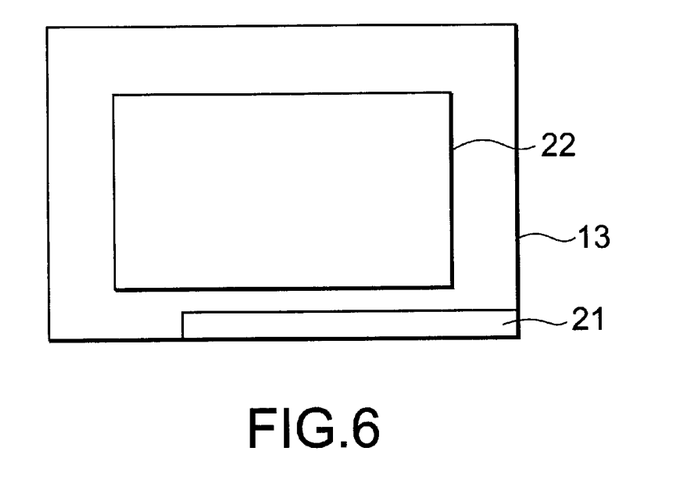
FIG. 6 is a top view showing the display state of a display for displaying a first window for an application program and a second window related to addresser information.

First, it is assumed that the first processing of an application program by an OS is executed. In this case, as shown in FIG. 6, a first window 22 for the first processing and an addresser-information form 21 serving as a second window to be displayed by the display control program in the program memory 16, are displayed on the screen of the display 13 (step S1). Under the above state, because the first processing displaying the window 22 is executed, a window focus is selected by the window 22.

Figure 7:
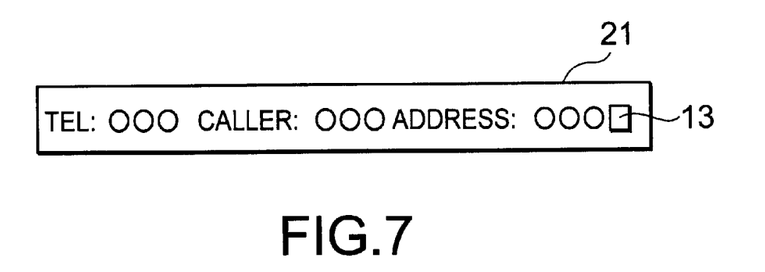
FIG. 7 is a top view showing details of a second window.

The addresser-information form 21 is displayed at the bottom right of the screen of the display 13, which is always displayed while an OS is executed. As shown in FIG. 7, an addresser telephone number, addresser name, and management information (address in FIG. 7) are displayed on one line. In step S1, because a call is not received yet, the display content of the addresser-information form 21 is blank.

The network interface 11 detects a call received from a network (step S2) and then continuously receives addresser information from the network line L1 and detects it (step S3). Though the addresser information may include character information in addition to an addresser telephone number, it is assumed here that the addresser information includes only the addresser telephone number. Unless the addresser information is detected, step S4 and subsequent steps are not executed and thereby, indications are not changed (step S12) The addresser information detected by the network interface 11 is communicated to the control circuit 12.

The control circuit 12 retrieves the first relevant information for an addresser out of the storage circuit 14 by using an addresser telephone number of addresser information as a key for search (step S4). For example, when an addresser telephone number is assumed as "03-3454-1111", the detailed information of No. 1 shown in FIG. 2 is retrieved out of the storage circuit 14. Then, the first relevant information to be displayed in the addresser-information form 21 shown in FIG. 7 (in this case, addresser name and address) is extracted out of the detailed information. In this case, when the first relevant information is not stored in the storage circuit 14 and therefore, it is not retrieved, the processing in step S20 in FIG. 5 to be described later is started.

When the first relevant information is retrieved, the display 13 displays the first relevant information including addresser information in the addresser-information form 21 serving as a second window under the display state in FIG. 6 in accordance with the control by the control circuit 12 (step S6). In this case, a popup button 31 is also displayed or activated in the addresser-information form 21 as shown in FIG. 7.

Because the addresser-information form 21 has a display priority higher than that of the first window 22 while the control circuit 12 keeps the window focus in the first window 22, the first processing of the window 22 is continued even if the first relevant information is displayed in the addresser-information form. Moreover, as shown in FIG. 6, the addresser-information form 21 is displayed at the bottom right of the display screen so as not to interrupt the window 22. Therefore, while an operator uses the window 22 of OS application software, the operation or processing of application software is not interrupted by displaying addresser-related information.

When an operator viewing the addresser-information form 21 wants to view the information more detailed than the displayed first relevant information, the operator clicks the popup button 31 in the addresser-information form with a mouse or the like serving as the input device 15. When the input device 15 is a keyboard, the operator presses the key assigned to a detailed-information display request.

Figure 8:
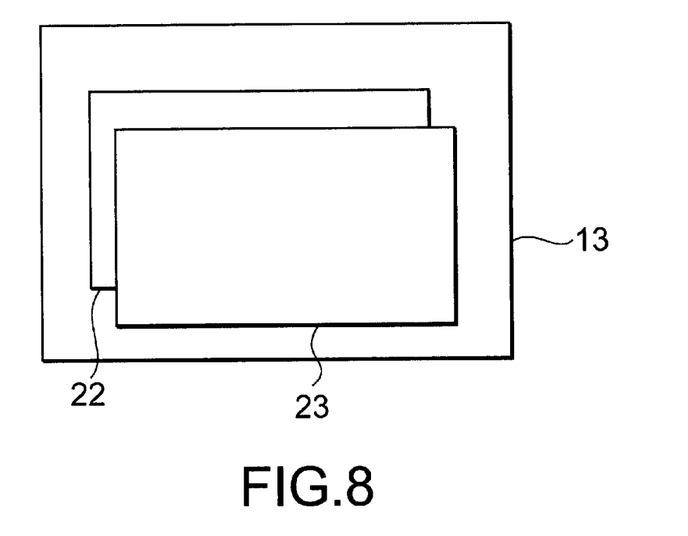
FIG. 8 is a top view showing the display state of a display for displaying a first window, a third window for addresser information, and a second window.

The control circuit 12 detects the operation by a mouse or keyboard as an event input (step S7). Thereby, the control circuit 12 retrieves a second relevant information including user information (purchase history in FIG. 2 in the case of this example) out of the storage circuit 14 (step S8). Then, as shown in FIG. 8, the circuit 12 displays the second relevant information in a third window 23 as detailed information. In this case, the control circuit 12 moves a window focus to the window 23. Therefore, as shown in FIG. 8, the window 23 is displayed (popup-displayed) at the front (step S9 in FIG. 4).

Then, when reception of a call is completed or conversation through the telephone 17 is completed, completion of conversation is communicated to the control circuit 12 from the network interface 11 (step S10). Thereby, the control circuit 12 deletes the window 23 displayed on the screen and moreover deletes the contents of the addresser-information form 21 displayed on the screen in FIG. 3 (step S11).

The conversation through the telephone 17 can be made before and after the event input in step S7. When an operator picks up the receiver of the telephone 17, the network interface 11 detects off-hook. Thereby, the network interface 11 automatically switches the network line L1 from the terminal-unit side to the telephone 17 to form a channel.

When a call is received from a network and the first relevant information of an addresser is displayed because the above control is executed and an operator decides that the reception of the call is not related to the processing by the operator, an environment in which the operation of the application software of an OS can be continued independently of the reception of the call is provided. In this case, the operation and processing by the first window 22 is not interrupted by the addresser-information display processing.

Moreover, the operator can decide whether the operator must perform the processing due to the reception of the call in accordance with the first relevant information of an addresser displayed on the addresser-information form 21 serving as the second window. When the operator decides that the operator must perform the processing, the operator can perform the event input for a detailed-information display request through the input device 15. Unless there is the event input, it is possible to continue the first processing by the window 22 without changing window focuses.

Moreover, in FIG. 3, the event input (step S7) can be established by the off-hook detection when the receiver of the telephone 17 is picked up. Thereby, by picking up the receiver, the third window 23 is automatically popup-displayed.

Then, steps S20 to S24 in FIG. 5 are described below. When it is decided that the first relevant information for an addresser is not stored in the storage circuit 14 as the result of retrieving the first relevant information, only an addresser number is displayed in the addresser-information form 21 in FIG. 6 (step S20). In this case, the popup button 13 is activated., When an operator clicks the popup button 13, a window for new entry is displayed and thereby, it is possible to newly enter addresser information (step S21). The addresser information is newly entered as the detailed information of the addresser telephone number "03-3454-1111" in the storage circuit 14 (step S22). In this case, when reception of a call is completed (step S23), the indication of the addresser) telephone number is deleted (step S24).

Therefore, the operator can decide the necessity for new entry by viewing that only the addresser number is displayed when a call is received. In this case, when the operator picks up the receiver of the telephone 17 and clicks the popup button 13 even under conversation, new entry can be continued. New entry can be continued even after the conversation is completed.

Moreover, when the first relevant information is not present in the storage circuit 14, the control circuit 12 can display in the addresser-information form 21 in step S20 that the first relevant information is not present in the storage circuit 14.

In the case of the above-described embodiment, it is possible to store information other than that shown in FIG. 2 as addresser's detailed information stored in the storage circuit 14. For example, it is also possible to store the user information including the company name, assigned section, and position of an addresser in the company, and product order information and delivery information.

Moreover, it is possible to display the telephone number, company name, and position of an addresser in the addresser-information form 21 as the first relevant information. Furthermore, it is possible to set the first relevant information to be displayed so that it can be changed by operating the input device 15. For example, it is possible to change the first relevant information from an address to a company name in accordance with a company-name display designation by the first operation of the input device 15.

Figure 9:
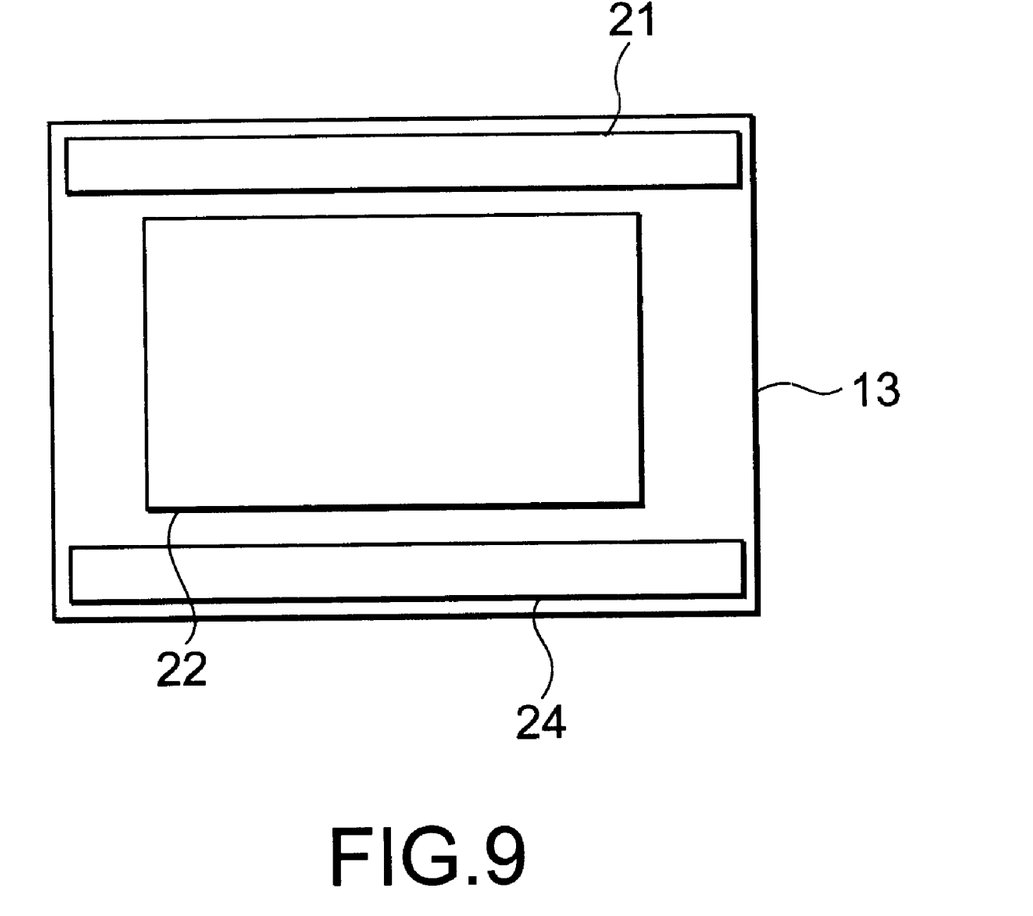
FIG. 9 is an illustration showing the display state of a display for displaying a tool-bar-type second window.

As shown in FIG. 9, a tool bar can be used as the display mode of the addresser-information form 21 serving as a first window. Moreover, in FIG. 9, the tool bar 24 is a tool bar originally provided for an operating system.

According to an embodiment of the present invention, an operator can decide whether to start the processing based on an addresser telephone number in accordance with the display content (first relevant information) of the addresser-information form 21 serving as a second window while the first processing according to an application program is executed. In this case, the operator can view detailed user information (second relevant information) while performing conversation with an addresser and moreover, view user information without performing conversation. As the processing based on an addresser telephone number, response to an inquiry about user information or additional product order from an addresser is considered.

Moreover, an operator who must perform the processing based on an addresser telephone number can perform the event input for a detailed-information display request through the input device 15 when the operator decides that he (or she) has to perform the processing based on the reception of the first relevant information displayed on the first window 21 or the operator can perform the processing of application software in the window 22 without changing indications when the operator decides that he (or she) does not have to perform the processing.

Figure 10:
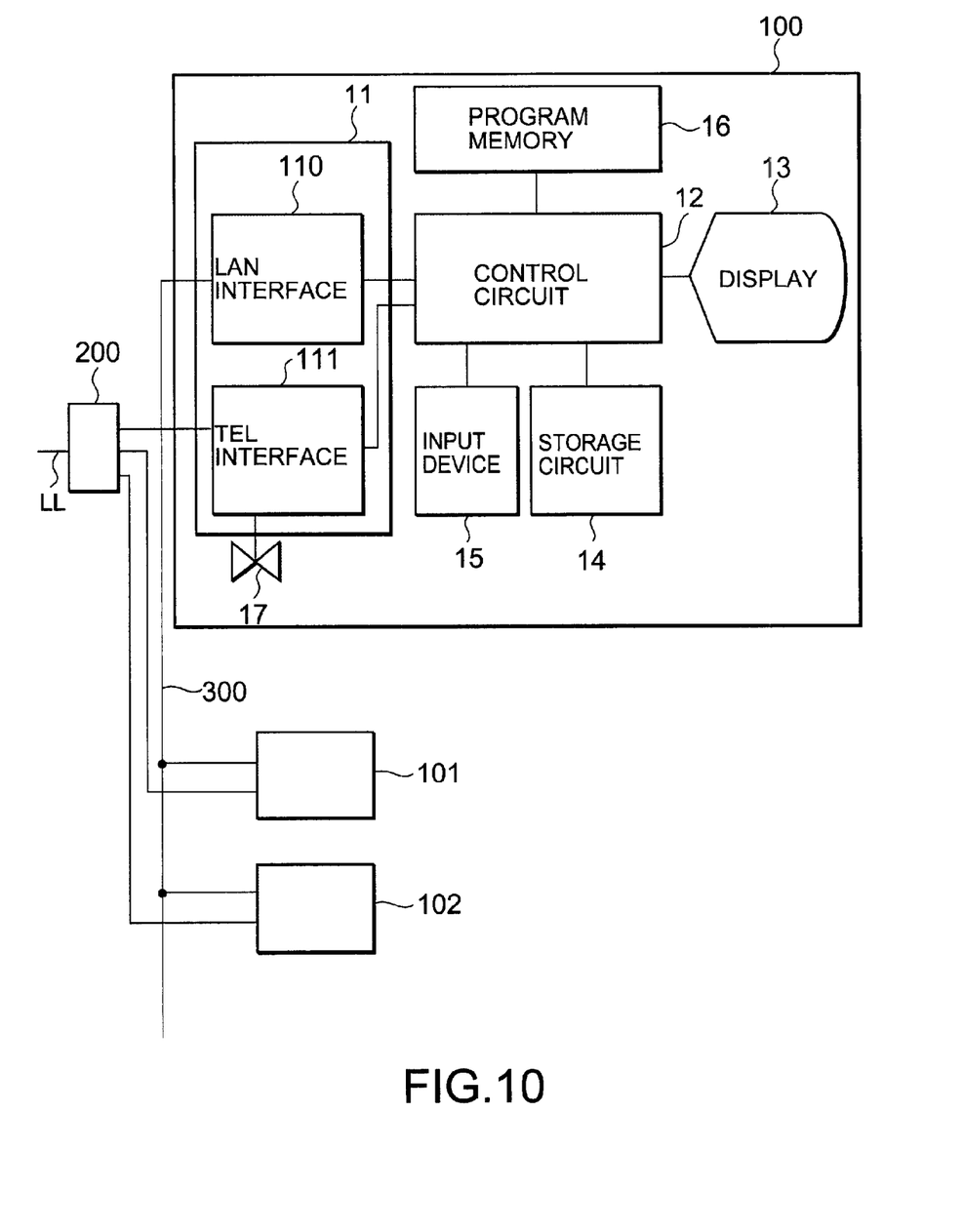
FIG. 10 is a block diagram showing the communication system of the second embodiment of the present invention.

FIG. 10 is a block diagram of the communication system showing the second embodiment of the present invention. In FIG. 10, pluralities of terminal units 100, 101, and 102 respectively capable of displaying an addresser are connected to an exchange unit 200 and a LAN line 300. The network interface 11 of each terminal unit has a LAN interface 110 connected to the LAN line 300 and a telephone interface 111 connected to the exchange unit 200. Other circuits of each terminal unit are the same as the communication system shown in FIG. 1.

A telephone line LL is shared by the terminal units 100, 101, and 102. When the exchange unit 200 detects a call received from the telephone line LL, it transmits a reception signal to the terminal units 100, 101, and 102. Thereby, the terminal units 100, 101, and 102 detect addresser information at the same time and the control circuit of each terminal unit executes the processings shown in FIGS. 3 to 5.

When one of the terminal units (e.g. terminal unit 100) executes the second relevant information retrieval or the event input for display (step S7 in FIG. 3), the window 23 in FIG. 7 is displayed on the terminal unit 100. In this case, the window 23 in FIG. 7 is not displayed on the terminal unit 101 or 102 because the event input is not detected. Moreover, when the terminal unit 100 responds to the reception of a call through the telephone 17 and the telephone line LL becomes busy, the exchange unit 200 communicates the busy state of the telephone line LL to the termination terminal units 101 and 102. Thereby, the telephone interface 111 of the terminal units 101 and 102 outputs a control signal to the control circuit 12 and contents displayed in the addresser-information form 21 disappear.

Figure 11:
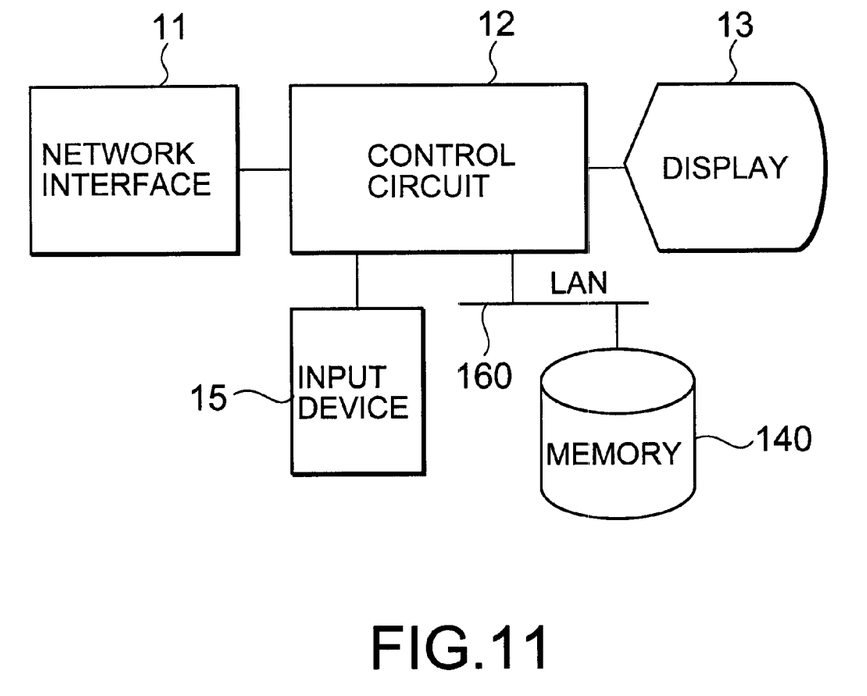
FIG. 11 is a block diagram showing the communication system of the third embodiment of the present invention.

FIG. 11 is a block diagram showing the third embodiment of the present invention. In the case of the embodiment shown in FIG. 11, a memory 140 is connected with the control circuit 12 by a LAN 160. Therefore, when addresser information is transmitted from the network interface 11, the control circuit 12 retrieves the first relevant information for an addresser out of the memory 140 through the LAN 160 by using an addresser telephone number as address information. The retrieved first relevant information is sent to the display 13 through the control circuit 12 and displayed in the addresser-information form 21 as shown in FIG. 6 or displayed in a tool bar as shown in FIG. 9.

Then, in FIG. 11, when the event input for a detailed-information display request is supplied to the input device 15, the control circuit 12 retrieves the second relevant information out of the memory 140 through the LAN 160 and displays the relevant information in the window 23 as detailed information as shown in FIG. 8.

Other controls are the same as the case of the embodiment shown in FIG. 1.

In the case of the embodiment shown in FIGS. 1, 10, or 11, the network interface 11, control circuit 12, display 13, and input device 15 can be realized as one information processor such as a personal computer.

Moreover, a storage circuit or memory can use any storage medium such as a semiconductor memory, magnetic disk, or optical disk.

As described above, a communication system of the present invention is constituted so as to retrieve the first relevant information for an addresser out of a storage medium in accordance with received addresser information and display the first relevant information in a second window different from the first windows and having a display priority lower than that of a first window according to first processing based on an application program. Therefore, it is possible to display only necessary and minimum addresser information without influencing an application currently used when a call is received.

Moreover, another invention is constituted so as to display first relevant information in a tool bar different from a window for first processing to be executed by an application program. Also in this case, a communication system can display only necessary and minimum addresser information without influencing an application currently used when a call is received.

A control circuit retrieves the detailed information (second relevant information) for an addresser out of a storage medium in accordance with an operator's display request input to an input device and displays the detailed information in a third window for displaying relevant information. Thereby, the operator can obtain more-detailed addresser-related information according to necessity.

When a control circuit is constituted so as to make the display priority of a third window higher than that of a first window for an application program, detailed information is displayed at the front without performing any operation and thereby, an operator can immediately start the processing based on addresser-related information.

What is claimed is:

1. A communication system connected to a network for receiving addresser information to make it possible to display information related to the addresser information in a display, comprising:

a storage medium for storing the information related to said addresser information; and a control circuit for controlling said display to display a first window for a first processing to be executed by an application program, retrieving first relevant information related to said addresser information out of said storage medium when said addresser information is received from said network, and controlling said display to display the retrieved first relevant information in a second window having a display priority higher than that of said first window while keeping a window focus in said first window.

2. The communication system according to claim 1 further comprising:

an input device for generating a display request; and said control circuit retrieves detailed information related to said addresser information out of said storage medium in accordance with the display request from said input device and controls said display to display the retrieved detailed information in a third window.

3. The communication system according to claim 2, wherein said control circuit makes the display priority of the third window higher than that of said first window.

4. The communication system according to claim 2, wherein said input device outputs a switching request for switching said first relevant information retrieved from said storage medium; and said control circuit switches said first relevant information displayed in said addresser-information form in accordance with said switching request.

5. The communication system according to claim 4 further comprising:

a telephone connected to said network; and said control circuit retrieves second relevant information related to said addresser information out of said storage medium in accordance with the response of said telephone and controls said display to display said retrieved second relevant information.

6. A communication system connected to a network for receiving addresser information to make it possible to display information related to the addresser information in a display, comprising:

a storage medium for storing the information related to said addresser information; and a control circuit for controlling said display to display a first window for a first processing to be executed by an application program, retrieving first relevant information related to said addresser information out of said storage medium when said addresser information is received from said network, and controlling said display to display the retrieved first relevant information in a tool-bar-type second window different from said first window.

7. The communication system according to claim 6, further comprising:

an input device for generating a display request, and said control circuit retrieves detailed information related to said addresser information out of said storage medium in accordance with the display request from said input device and controls said display to display the retrieved detailed information in a third window.

8. The communication system according to claim 7, wherein said control circuit makes the display priority of the third window higher than that of said first window.

9. A communication system connected to a network for receiving addresser information, comprising:

a network interface connected to said network to detect said addresser information in a termination mode;

a storage medium for storing first relevant information and second relevant information related to said addresser information;

a display; and a control circuit for controlling said display to display a first window for a first processing to be executed by an application program, retrieving said first relevant information out of said storage medium in accordance with said addresser information when said addresser information is detected by said network interface, and controlling said display to display the retrieved first relevant information in an addresser-information form while keeping a window focus in said first window, said addresser-information form being displayed in an independent area.

10. The communication system according to claim 9, further comprising:

an input device for generating a display request; and said control circuit retrieves second relevant information related to said addresser information out of said storage medium in accordance with the display request from said input device and controls said display to display said retrieved second relevant information.

11. The communication system according to claim 9, wherein said addresser-information form is a tool-bar-type window.

12. A display method for displaying information related to addresser information received from a network, comprising the steps of:

preparing a storage medium for storing the information related to said addresser information;

displaying a first window for first processing to be executed by an application program and retrieving first relevant information related to said addresser information out of said storage medium when said addresser information is received from said network; and displaying said first relevant information in an addresser-information form different from said first window while keeping a window focus in said first window.

13. The display method according to claim 12, further comprising the steps of:

generating a display request;

retrieving the detailed information related to said addresser information out of said storage medium in accordance with said display request; and displaying said retrieved detailed information.

* * * * *